US010158832B2

(12) United States Patent
Malik et al.

(10) Patent No.: US 10,158,832 B2
(45) Date of Patent: *Dec. 18, 2018

(54) LENS AND COLOR FILTER ARRANGEMENT, SUPER-RESOLUTION CAMERA SYSTEM AND METHOD

(71) Applicant: Sony Corporation, Tokyo (JP)

(72) Inventors: Waqas Malik, Stuttgart (DE);
Muhammad Siddiqui, Esslingen (DE);
Markus Kamm, Karlsruhe (DE);
Manfred Manz, Ostfildern (DE)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,636

(22) Filed: Sep. 25, 2017

(65) Prior Publication Data

US 2018/0013987 A1    Jan. 11, 2018

Related U.S. Application Data

(63) Continuation of application No. 14/814,317, filed on Jul. 30, 2015, now Pat. No. 9,813,680, which is a
(Continued)

(30) Foreign Application Priority Data

Nov. 3, 2010    (EP) .................................... 10014268

(51) Int. Cl.
*H04N 9/04*    (2006.01)
*G06T 3/40*    (2006.01)

(52) U.S. Cl.
CPC ........... *H04N 9/045* (2013.01); *G06T 3/4015* (2013.01); *G06T 3/4069* (2013.01); *H04N 2209/046* (2013.01); *Y10T 29/49826* (2015.01)

(58) Field of Classification Search
CPC .............. H04N 9/045; H04N 2209/046; G06T 3/4015; G06T 3/4069; Y10T 29/49826
See application file for complete search history.

(56) References Cited

U.S. PATENT DOCUMENTS

| 7,379,612 B2 | 5/2008 | Milanfar et al. |
| 7,453,498 B2 | 11/2008 | Prentice et al. |

(Continued)

FOREIGN PATENT DOCUMENTS

| CN | 101098399 A | 1/2008 |
| CN | 101213830 A | 7/2008 |

(Continued)

OTHER PUBLICATIONS

Xin Li, "Demosaicing by Successive Approximation", IEEE Transactions on Image Processing, vol. 14, No. 3, Mar. 2005, pp. 370-379.

(Continued)

*Primary Examiner* — Padma Haliyur
(74) *Attorney, Agent, or Firm* — XSensus LLP (57) ABSTRACT

A lens and color filter assembly contains lens units, and each lens unit is assigned to a single-color color filter unit. The lens and color filter assembly may be combined with pixel units such that a plurality of monochromatic, low-resolution images can be obtained, and the monochromatic images refer to shifted versions of the same image object. By a super-resolution technique comprising shift-compensation a mosaicked image is obtained which is then demosaiced. In the resultant image only few artifacts appear. Simple color filter arrays allow a simplified fabrication process and provide less chromatic aberrations at less computational effort.

21 Claims, 13 Drawing Sheets

Related U.S. Application Data continuation of application No. 13/240,361, filed on Sep. 22, 2011, now Pat. No. 9,137,503.

(56) References Cited

U.S. PATENT DOCUMENTS

| | | | |
|---|---|---|---|
| 7,940,282 | B2 | 5/2011 | Milanfar et al. |
| 2006/0125936 | A1 | 6/2006 | Gruhike et al. |
| 2007/0034777 | A1 | 2/2007 | Tuckerman et al. |
| 2007/0070267 | A1 | 3/2007 | Yang |
| 2007/0071362 | A1 | 3/2007 | Milanfar et al. |
| 2009/0101947 | A1 | 4/2009 | Lin et al. |
| 2010/0128149 | A1 | 5/2010 | Kim et al. |
| 2010/0208100 | A9 | 8/2010 | Olsen |
| 2010/0238330 | A1 | 9/2010 | Hirota |
| 2014/0192238 | A1 | 7/2014 | Attar et al. |

FOREIGN PATENT DOCUMENTS

| | | |
|---|---|---|
| CN | 101854488 A | 10/2010 |
| EP | 1 699 233 A1 | 9/2006 |

OTHER PUBLICATIONS

Sina Farsiu, et al., "Multi-Frame Demosaicing and Super-Resolution of Color Images", IEEE Transactions on Image Processing, vol. 15, No. 1, Jan. 2006, 39 pages.

Combined Office Action and Search Report dated Dec. 30, 2015 in Chinese Patent Application No. 201110348499.1 (with English translation of Categories of Cited Documents).

Office Action dated Sep. 1, 2016 in Chinese Patent Application No. 201110348499.1.

Office Action dated Jan. 11, 2017 in Chinese Patent Application No. 201110348499.1.

LENS AND COLOR FILTER ARRANGEMENT, SUPER-RESOLUTION CAMERA SYSTEM AND METHOD

CROSS-REFERENCE TO RELATED APPLICATIONS

This application is a continuation of U.S. application Ser. No. 14/814,317 filed Jul. 30, 2015, which is a continuation of U.S. application Ser. No. 13/240,361 filed Sep. 22, 2011, now U.S. Pat. No. 9,137,503, which claims the benefit of priority to European Patent Application No. 10014268.6 filed on Nov. 3, 2010, in the European Patent Office. The entire disclosures of the above patent applications are hereby incorporated by reference.

BACKGROUND OF THE INVENTION

Field of the Invention

The present invention relates to the field of electronic photography. An embodiment relates to a camera system with a plurality of lens units for using super-resolution techniques. Another embodiment refers to a lens and colour filter arrangement for such a camera system. Further embodiments refer to a method of operating a camera system using super-resolution and to a method of manufacturing such a camera system.

Description of Related Art

A conventional digital camera uses a colour filter array arranged over a sensor array such that each image pixel is associated with a particular filter colour and each image pixel signal relates to one colour, for example to either red, green or blue.

Accordingly, the number of pixels assigned to each colour is only a subset of all available image pixels. To obtain a full resolution image for each filter colour, demosaicing methods estimate or interpolate missing pixel values from the pixel values of the surrounding pixels for each filter colour. A method of demosaicing using successive approximation is described in Xin Li; "Demosaicing by Successive Approximation"; IEEE Transactions on Image Processing, Vol. 14, No. 3, March 2005. Further in the field of electronic photography, compound-eye cameras are known that include lens arrays to obtain a plurality of low-resolution images on a photo detector, each of the low-resolution images representing shifted versions of the same scene. EP 1 699 233 A1 refers to a method of estimating a single high-resolution image from a plurality of low-resolution images.

Sina Farsiu et al., "Multi-Frame Demosaicing and Super-Resolution of Colour Images", IEEE Transactions on Image Processing, Vol. 15, No. 1, pp. 141-159, January 2006 refers to a general model for imaging systems merging super-resolution and demosaicing into one process.

BRIEF SUMMARY OF THE INVENTION

The object of the invention is to provide an enhanced camera system merging super-resolution and demosaicing. The object is achieved with the subject-matter of the independent claims. Further embodiments are defined in the dependent claims, respectively. Details and advantages of the invention will become more apparent from the following description of embodiments in connection with the accompanying drawings. Features of the various embodiments may be combined unless they exclude each other.

DETAILED DESCRIPTION OF THE INVENTION

Figure 1A:
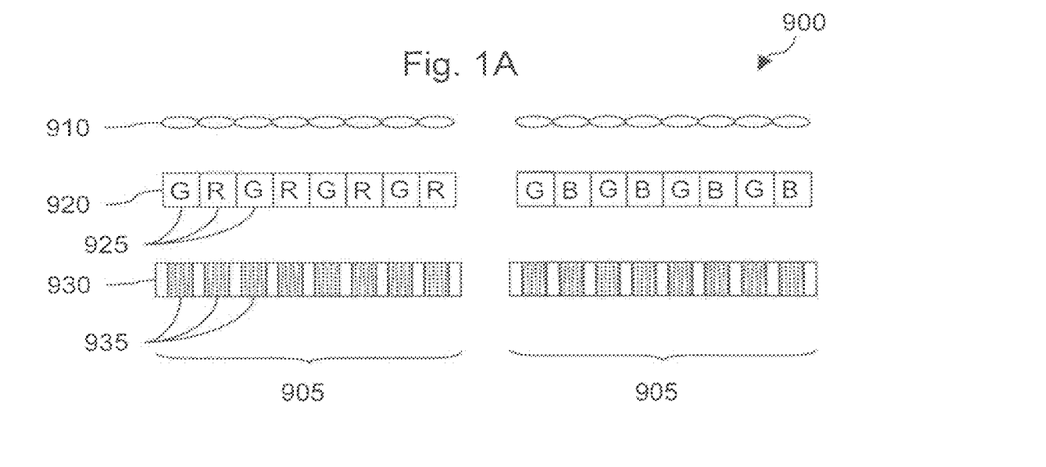
FIG. 1A is a schematic cross-sectional view of an arrangement including lens units, colour filter units and pixel units for discussing effects of the invention.

FIG. 1A refers to an image sensor device 900 with several image sensor units 905. Each image sensor unit 905 includes a lens unit 910 focussing an image of a scene or object on a pixel unit 930 of the respective image sensor unit 910. Each pixel unit 930 comprises a plurality of pixel sensors 935. A colour filter unit 920 is arranged between each lens unit 910 and the corresponding pixel unit 930. The colour filter unit 920 includes a plurality of colour filter sections 925, wherein each colour filter section 925 has a filter colour, for example green, red or blue. Each colour filter section 925 is assigned to one pixel sensor 935 such that each pixel sensor 935 receives colour-specific image information.

Figure 1B:
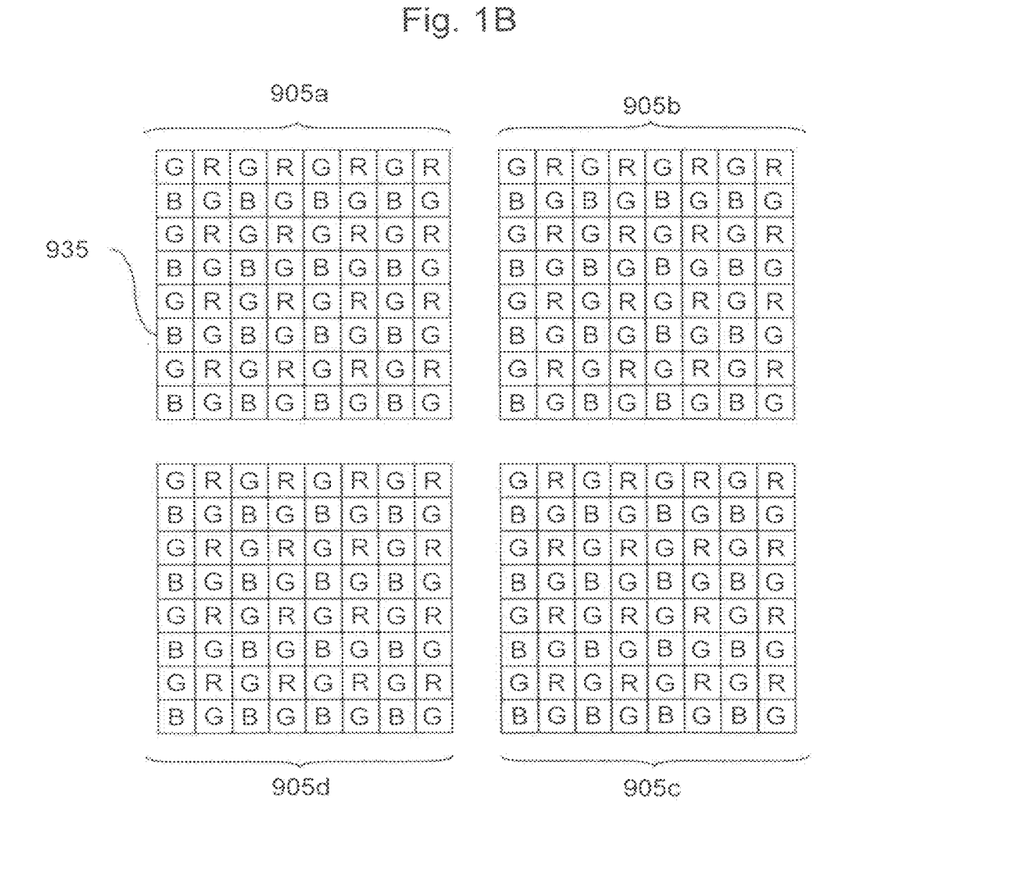
FIG. 1B is a schematic top view of the arrangement of FIG. 1A.

FIG. 1B shows a typical assignment of filter colours R, G, B to colour filter sections and the corresponding pixel sensors 935. Four of the image sensor units 905*a-d* including a lens unit 910, a colour filter unit 920 and a pixel unit 930 respectively, can be arranged to form a matrix, wherein each image sensor units 905a-d receives shifted versions of the original scene.

Figure 1C:
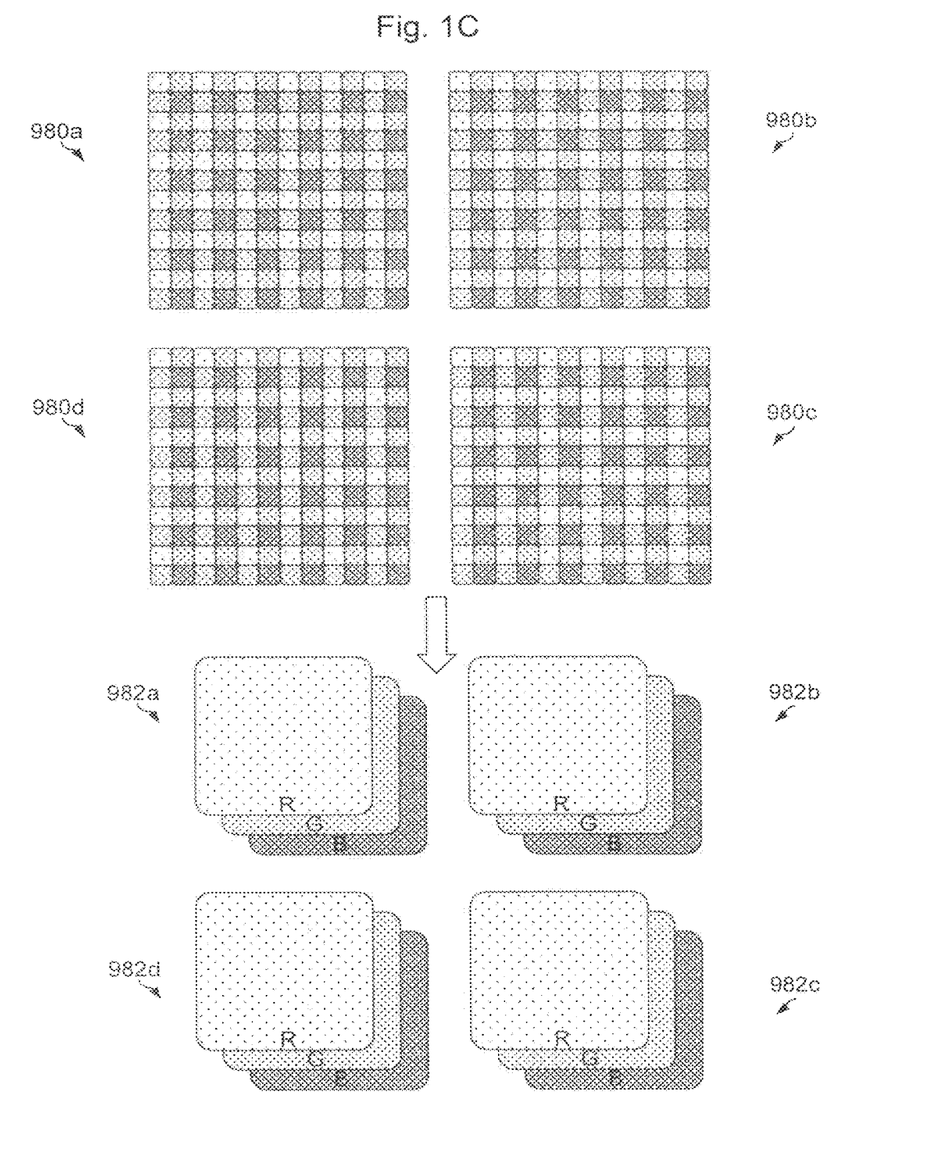
FIG. 1C is a schematic diagram illustrating a process of demosaicing low-resolution images obtained by the arrangement of FIGS. 1A and B.

Referring now to FIG. 1C, each of the four image sensor units 905a-d generates, for each filter colour R, G, B a low-resolution image 980a-d. Each low-resolution image 980a-d is described by a lower number of pixel values than pixel sensors are available in each pixel unit. Using demosaicing techniques, for each image sensor units 905a-d and for each filter colour the pixel values of image pixels assigned to another filter colour are estimated on the basis of, for example, the surrounding pixel values. As a result, for each image sensor unit 905a-d and each filter colour an up-sampled monochromatic image is derived having, for example, the same number of pixel values as each pixel unit has pixel sensors. The lower half of FIG. 1C shows the four resulting sets 982a-d of monochromatic, "blown-up" images. The sets of monochromatic images 982a-d refer to shifted versions of the same scene.

Figure 1D:
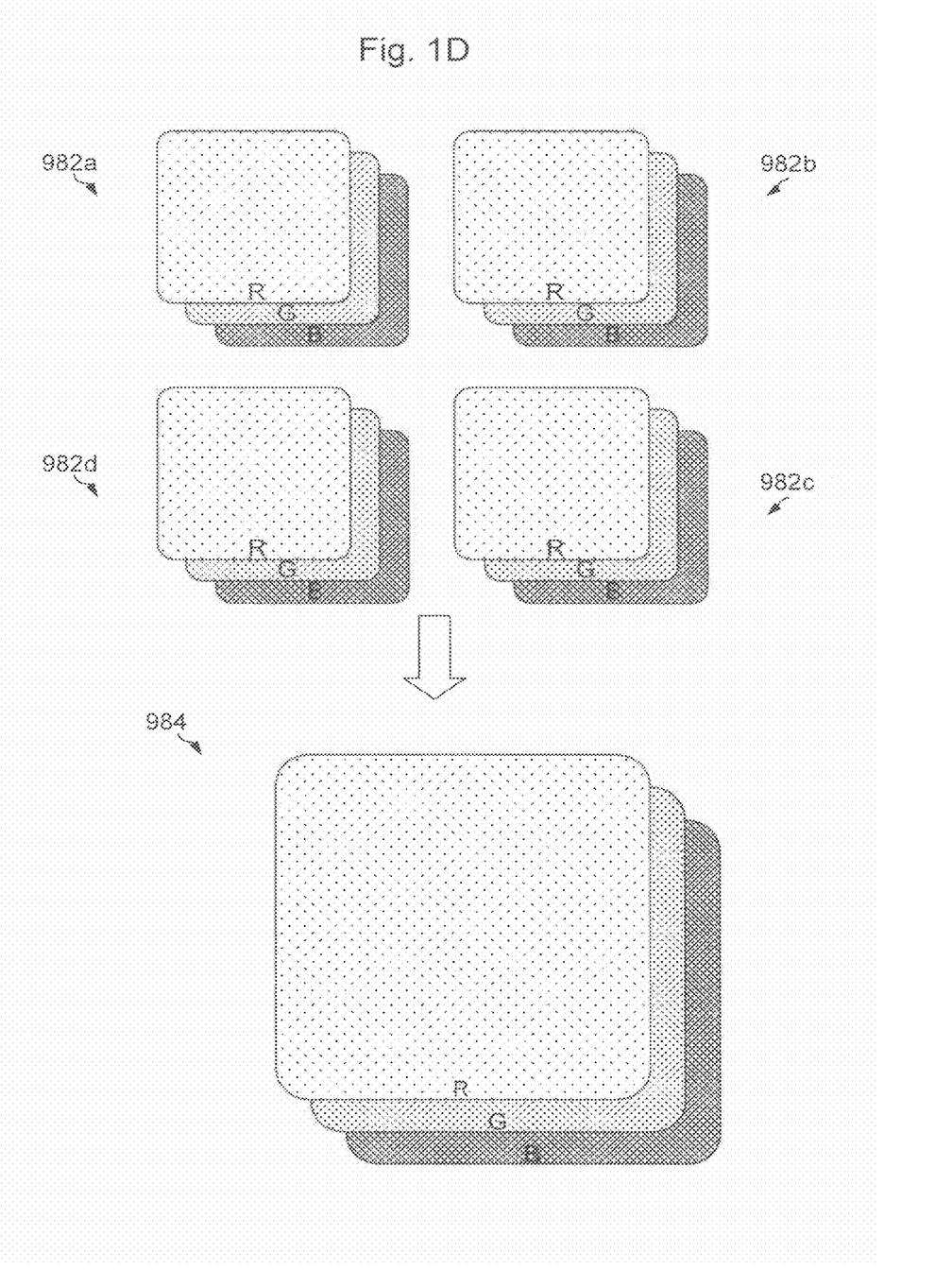
FIG. 1D is a schematic diagram illustrating a super-resolution process on the basis of the low-resolution images obtained by the demosaicing process of FIG. 1C.

As shown in FIG. 1D the monochromatic images of the sets 982a-d are combined by super-resolution techniques to obtain, for each filter colour, a high-resolution image from which a polychromatic high resolution image 984 can be obtained by appropriate superposition techniques selected in accordance with the used filter colours.

Figure 1E:
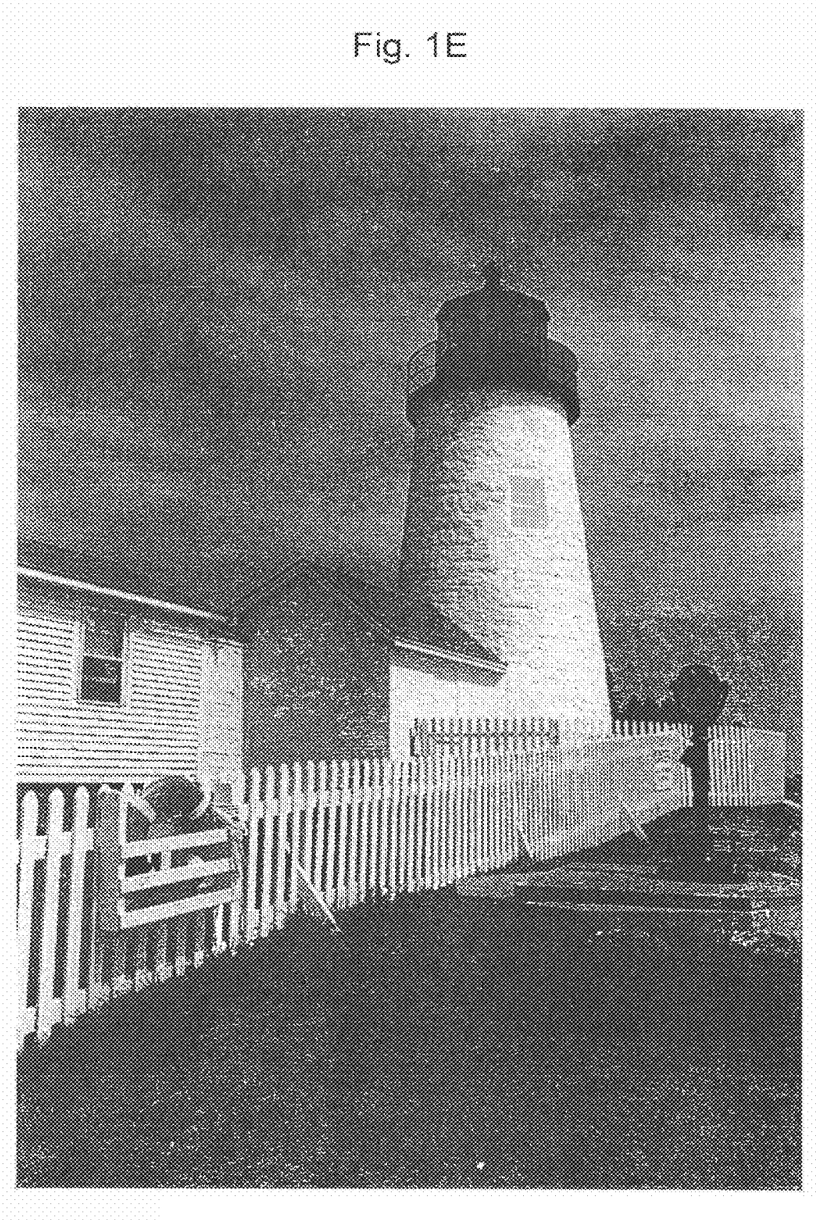
FIG. 1E is a reference image of a test scene.
Figure 1F:
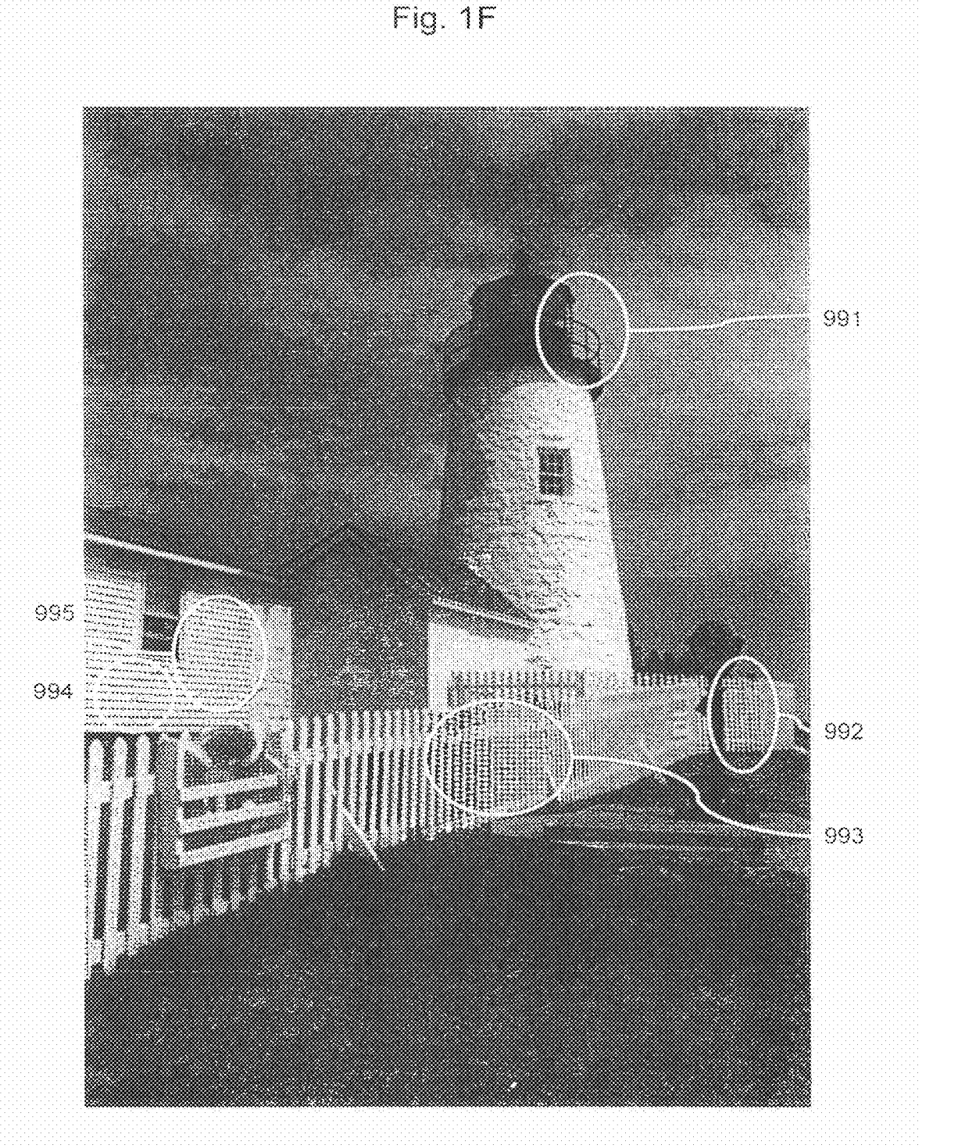
FIG. 1F is an image obtained from the test scene of FIG. 1E by a conventional approach for combining demosaicing and super-resolution processes as described with FIGS. 1C and D for discussing effects of the invention.

FIG. 1E shows an original image and FIG. 1F an image obtained by reconstructing a full colour high-resolution image from a set of low-resolution images captured by a lens array camera system with colour filters arranged in a Bayer mosaic pattern. FIG. 1F shows that applying a super-resolution approach to demosaiced low-resolution images produces typical artefacts. For example, the vertical pickets in the fence in areas 993, 992, which appear bright beige in the original test scene, undergo a colour aberration and appear partly yellow and partly blue. The horizontal shelves in regions 995 appear to be superimposed by yellow and blue diagonal stripes. In regions 991 and 994 zipper artefacts and aliasing occurs with regard to the shelves and thin guardrail rods, where pixels along edges appear to be alternately on or off the edge. Smaller pixel sensor areas result in stronger aliasing effects in the low-resolution images. The aliasing effects in the low-resolution images result in artefacts after demosaicing as shown in FIG. 1F.

Figure 2A:
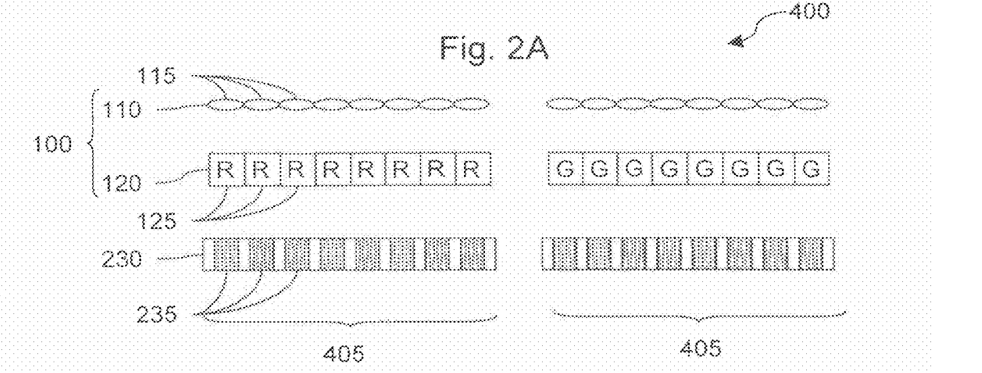
FIG. 2A is a schematic cross-sectional view of an arrangement including a lens and colour filter arrangement according to an embodiment of the invention.

FIG. 2A refers to a lens and colour filter assembly 100 according to an embodiment of the invention. The lens and colour filter assembly 100 includes a plurality of lens units 110 and colour filter units 120, wherein each colour filter unit 120 is assigned to one of the lens units 110. Each colour filter unit 120 includes a plurality of colour filter sections 125. The colour filter sections 125 may be separated from each other by separation structures or may directly adjoin to each other to form a continuous, homogeneous structure or layer. Each colour filter section 125 filters light by wavelength range, wherein the wavelength range describing the passing light defines the filter colour of a colour filter section 235.

According to the embodiments of the invention the lens and colour filter assembly 100 comprises colour filter sections 235 of at least three different filter colours wherein each colour filter unit 120 is single-coloured and contains only colour filter sections 125 of the same filter colour. According to an embodiment each lens unit 110 may be realized as a micro-lens array formed by a plurality of micro-lenses 115, wherein each micro-lens 115 is assigned to one single of the colour filter sections 125. Light that orthogonally incidents on and passes through one of the micro-lenses 115 passes through one single of the colour filter sections 125. The micro-lens array may be formed from silicon oxide, by way of example.

FIG. 2A further refers to an image sensor device 400 with a plurality of image sensor units 405. Each image sensor unit 405 includes one lens unit 110, one colour filter unit 120 and one pixel unit 230, such that each pixel unit 230 is assigned to one of the lens units 110 and one of the colour filter units 120. Each pixel unit 230 includes a plurality of pixel sensors 235, wherein each pixel sensor 235 contains a photosensor for converting a photosignal from an incident light into an electronic signal. The pixel sensors 235 may be formed in a semiconductor substrate and transparent layers may separate the colour filter unit 120 from the pixel unit 230 and the lens unit 110. Each image sensor unit 405 contains colour filter sections 125 with the same filter colour such that each image sensor unit 405, delivers a monochromatic image of a scene. The image sensor device 400 with the lens and colour filter assembly 100 comprises at least three image sensor units 405 with three different filter colours. The colour filter units 120 are single-coloured such that each of them projects a monochromatic image on the respective pixel unit 230.

According to an embodiment, the lens and colour filter assembly 100 comprises an even number of lens and colour filter units 110, 120 arranged in a matrix. For example, the lens and colour filter assembly 100 may contain four lens units 110 and four colour filter units 120 wherein the colour filter units 120 are arranged to form a Bayer mosaic pattern wherein colour filter units 120 containing colour filter sections 125 with the filter colour "Green" are arranged on a first diagonal and one colour filter unit 120 containing colour filter sections 125 with the filter colour "Red" and one colour filter 120 with colour filter sections 125 with the filter colour "Blue" are arranged on the other diagonal of the matrix. With the Bayer mosaic pattern the sampling rate for the filter colour "Green" is twice that of the filter colours "Red" and "Blue" to take into account that the colour green carries most of the luminance information for the human eye.

According to another embodiment, filter units 120 are arranged to form a RGBE-mosaic pattern with "Emerald" as a fourth filter colour, a CYYM mosaic pattern with one cyan, two yellow and one magenta colour filter units 120 or a CYGM mosaic pattern with one cyan, one yellow, one green and one magenta colour filter unit. According to another embodiment, the lens and colour filter arrangement 100 includes three colour filter units 120 and a transparent unit without colour filtering properties and transmissive for all colours. The transparent and the colour filter units 120 may be arranged to form an RGBW Bayer mosaic pattern, or a 4×4 or 2×4 RGBW mosaic pattern, by way of example.

Figure 2B:
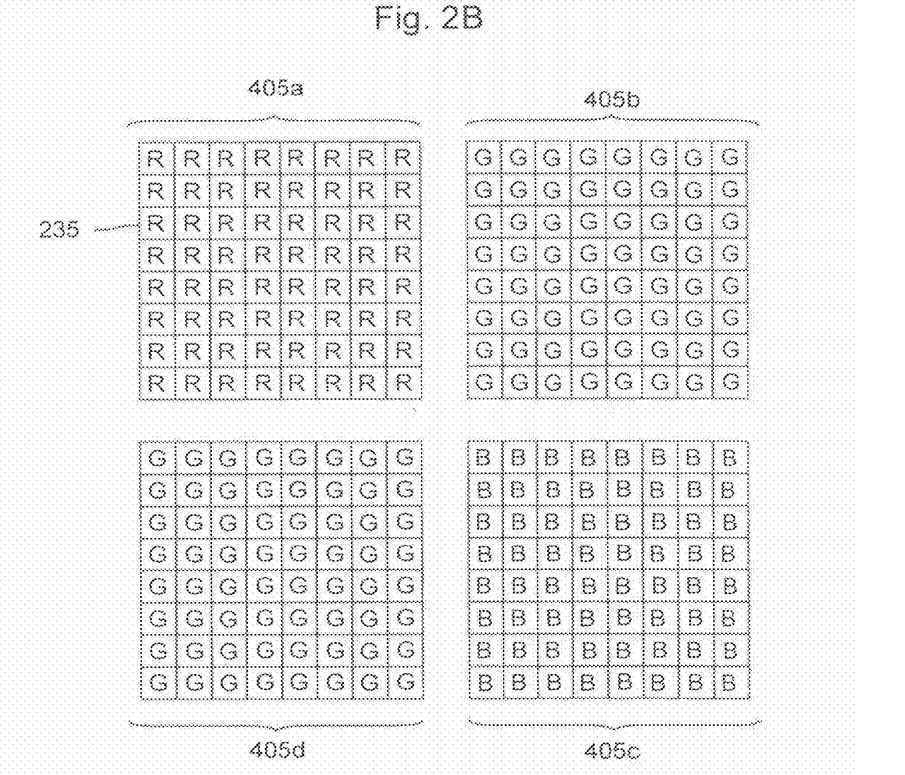
FIG. 2B is a schematic top view of the arrangement of FIG. 2A.

FIG. 2B refers to an embodiment with four image sensor units 405a-d arranged in a 2×2 matrix, wherein the filter colours assigned to the respective colour filter units form a Bayer pattern. In addition, corresponding pixel sensors 235 in the image sensor unit 405a-d are shifted against each other with reference to a reference point in the imaged scene such that each image sensor unit 405a-d images the scene from slightly deviating positions. For example, the images captured by the image sensor units 405a-d have a sub-pixel shift among each other.

Figure 4:
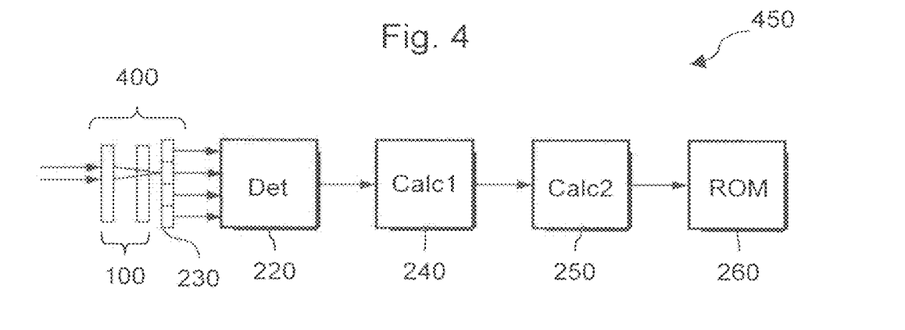
FIG. 4 is a schematic block diagram of a camera system in accordance with another embodiment.

FIG. 4 refers to a camera system 450 including a lens and colour filter arrangement 100 and pixel units 230. A detection unit 220 obtains from each pixel unit 230 monochromatic, low-resolution images, wherein the monochromatic low-resolution images of different pixel units 230 are shifted versions of the same scene or object. For example, with regard to an embodiment containing a plurality of image sensor units arranged in a M×N matrix the images obtained from image sensor units of the same column may be shifted by the same shift value along a first direction with regard to the images obtained from image sensor units assigned to neighbouring columns. Accordingly, images obtained from image sensor units assigned to the same row may be shifted by the same amount along a second direction, which may be perpendicular to the first direction, with regard to the image sensor units assigned to neighbouring rows. The shift amount may be the half pixel width in the corresponding direction or an odd multitude of the respective half pixel width.

A first calculator unit 240 combines the monochromatic low-resolution images obtained from the pixel units 230 to a mosaicked image by shift-compensation and interdigitating pixel values output by the pixel sensors of the pixel units. For example, from two monochromatic low-resolution images shifted along a first direction, a first up-sampled picture may be obtained where each odd column results from the first low-resolution image and each even column results from the second low-resolution image. From two of such pairs of low-resolution images shifted along a second direction perpendicular to the first direction a further up-sampled image may be obtained, wherein each odd row is given by the first up-sampled picture of the first pair and each even row may be defined by the first up-sampled picture of the second pair of primary images.

Figure 6:
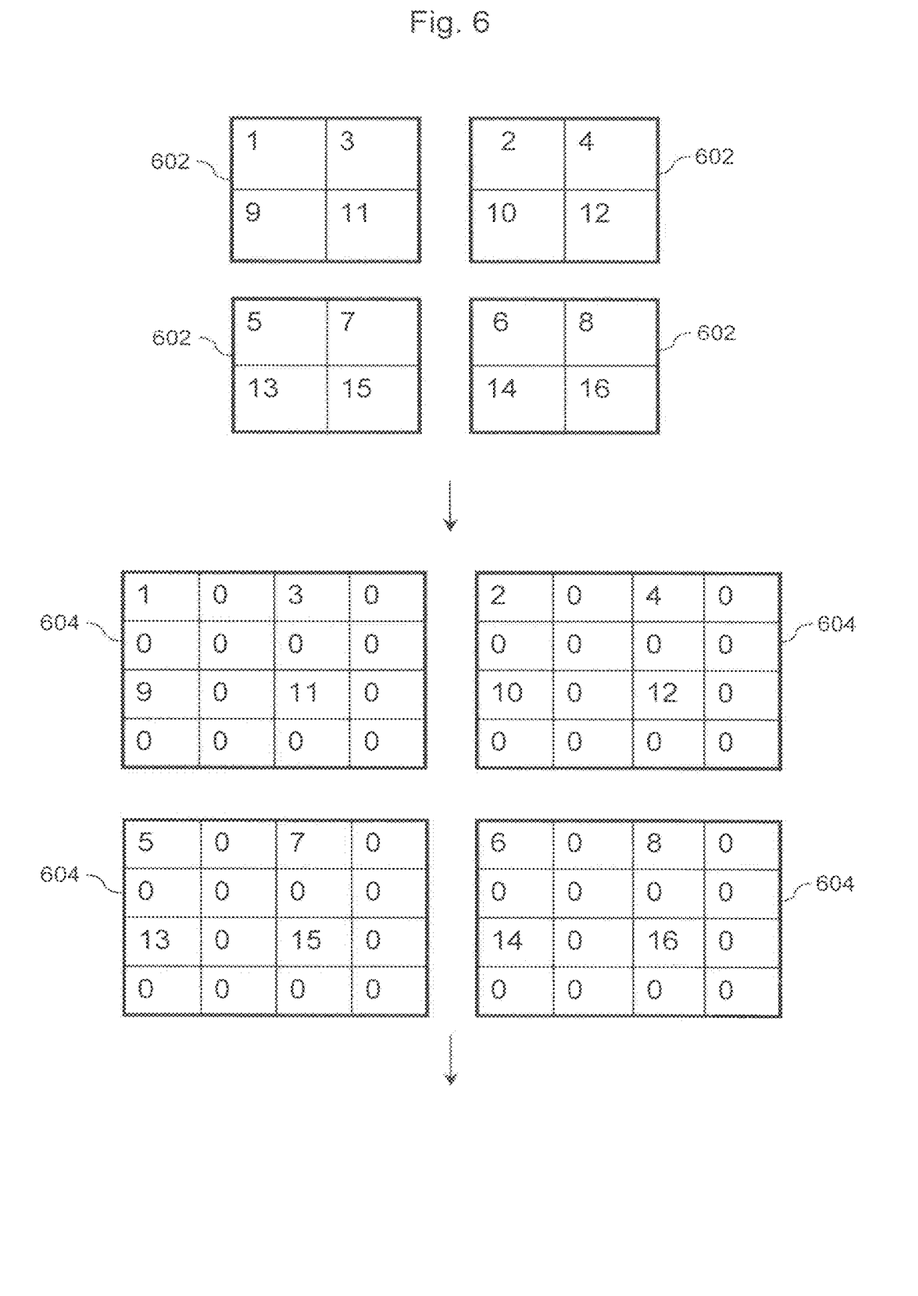
FIG. 6 is a schematic diagram for illustrating a process of shift compensation and interdigitating according to an embodiment of the invention.

FIG. 6 illustrates the process of interdigitating by way of an example referring to four monochromatic low-resolution images 602 obtained from four matrix-like arranged pixel units. The shift between the four images 602 corresponds to a half-pixel displacement between the images 602 above and below and a half-pixel displacement between the images 602 on the left hand side and that on the right hand side. The four images 602 are schematically illustrated at the top of the Figure, wherein numbers 1 to 16 are used to identify corresponding pixel values in the following.

In a first step, from each low-resolution image 602 an up-sampled image 604 is obtained by inserting zero columns and zero rows. For example, each even column is a zero column containing only zero values and each even row is a zero row containing only zero values. The remaining values are obtained from the original low-resolution image 602, wherein the position of the values relative to each other is maintained.

In a second step the pixel values in three of the up-sampled images 604 are shifted corresponding to their respective shift values to obtain up-sampled shifted images 606. For example, the pixel values are shifted from one column to the neighbouring column and/or from one row to the neighbouring row. Finally the up-sampled shifted images 606 are superposed or added to obtain the up-sampled shift-compensated image 608.

Figure 2C:
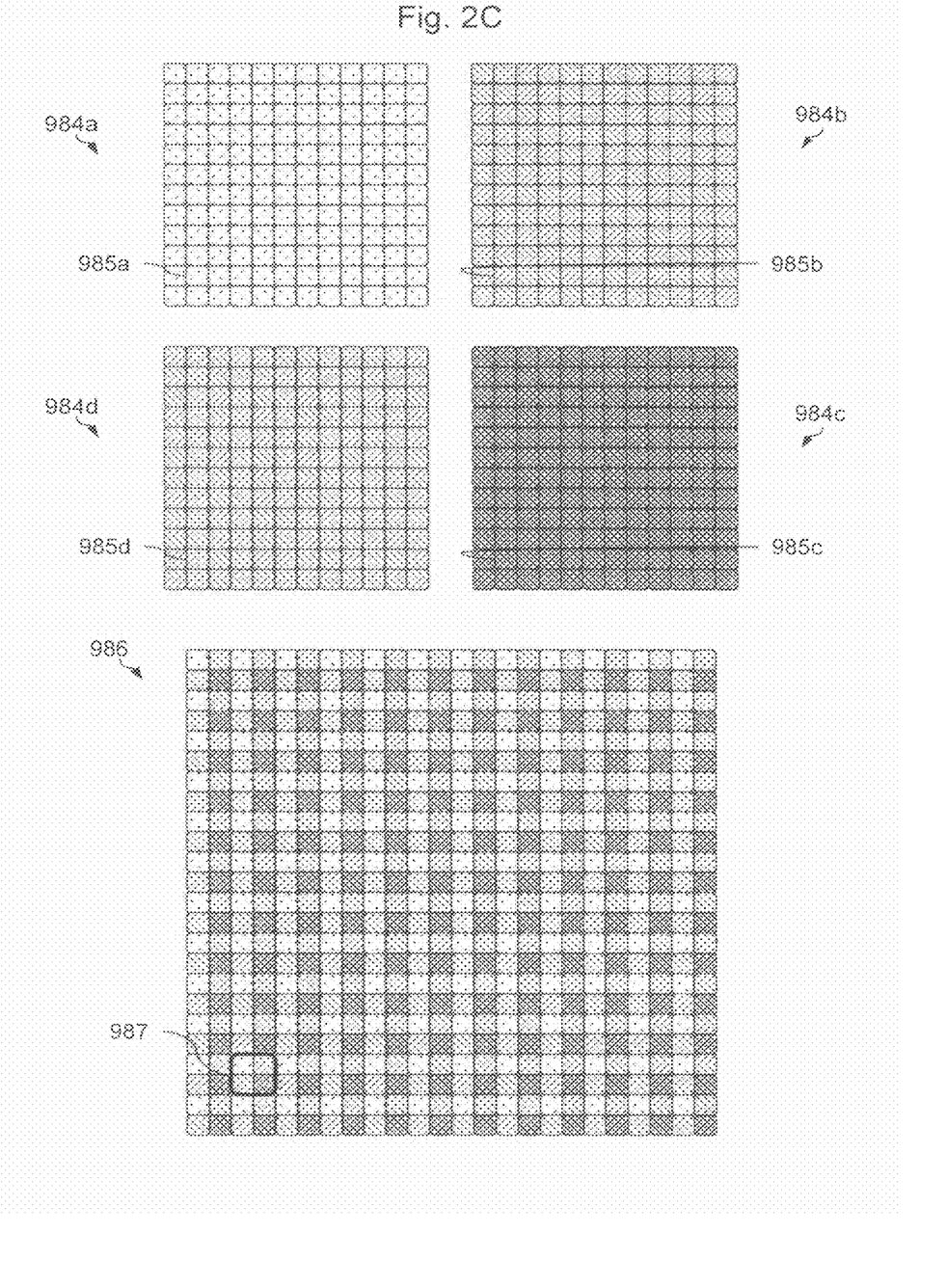
FIG. 2C is a schematic diagram illustrating a process of obtaining a mosaicked image on the basis of a plurality of monochromatic low-resolution images obtained by the arrangement of FIGS. 2A and B.

FIG. 2C refers to a process performed by the first calculator unit 240 of FIG. 4. In the upper half FIG. 2C shows the four monochromatic images 984a-d obtained from the four image sensor units 405a-d of FIG. 2B. Interdigitating corresponding pixel values may include shift compensation as used in super-resolution techniques. For example, corresponding pixel values 985a-d in the monochromatic low-resolution images may correspond to a pixel cluster 987 the mosaicked image 986. Grouping pixel values that are output by corresponding pixel sensors of all pixel units to pixel clusters according to the shift measures may consider pixel values of surrounding pixel sensors. The pixel clusters 987 are grouped in matrix corresponding to that of the pixel sensors. Within each pixel cluster 987, pixel values assigned to a certain filter colour are grouped to a matrix which mosaic pattern may correspond to the colour filter pattern formed by the colour filter units. For example, where the colour filter units are arranged to form a Bayer mosaic pattern, the pixel values in the pixel cluster 987 may also form a Bayer mosaic pattern.

Returning to FIG. 4 the camera system 450 further comprises a second calculator unit 250 for demosaicing the mosaicked image 986 of FIG. 2C. Demosaicing may contain interpolating, for each filter colour, missing pixel values on the basis of pixel values of neighbouring pixel sensors. The resulting image may be stored in a storage unit 260, for example as values representing three high-resolution monochromatic images.

Figure 2D:
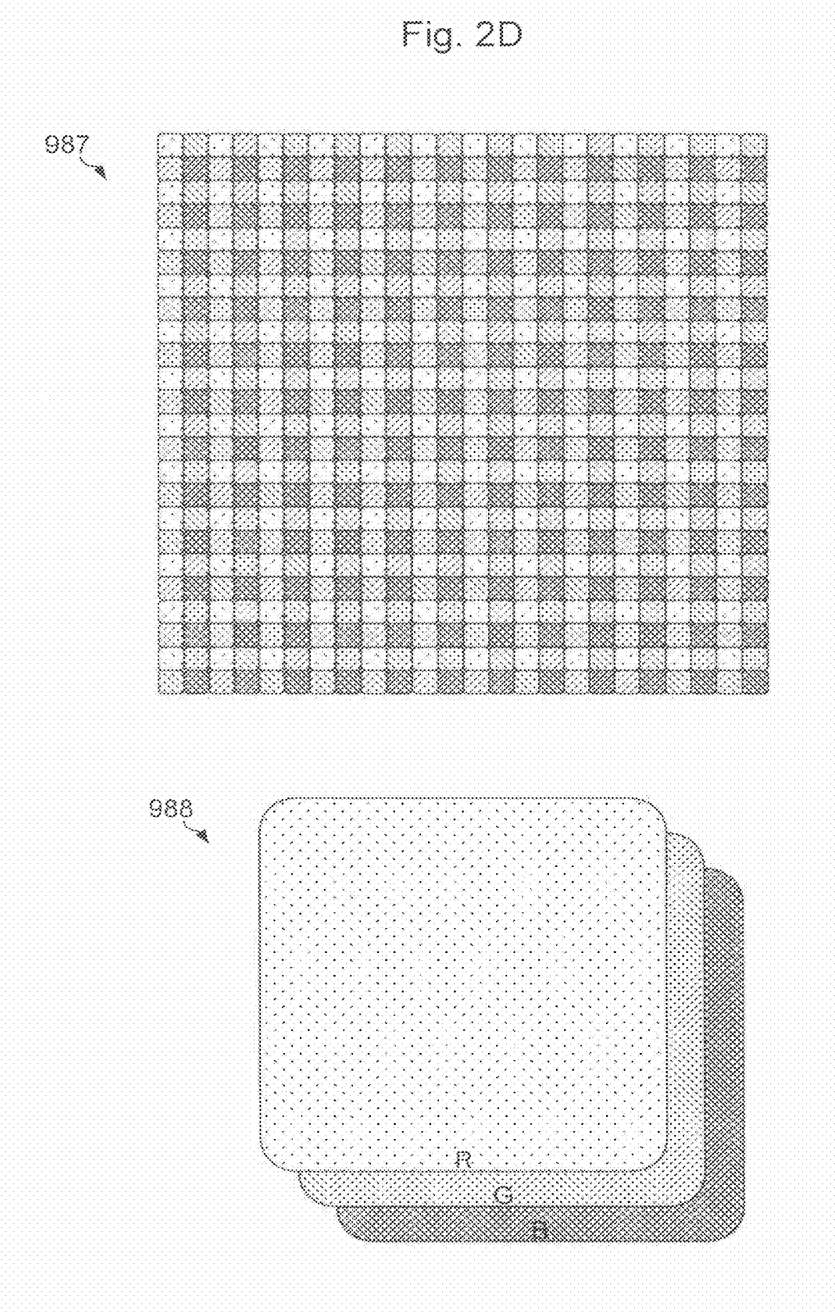
FIG. 2D is a schematic diagram illustrating the process of demosaicing the mosaicked image of FIG. 2C to obtain a polychromatic high-resolution image.

FIG. 2D illustrates the demosaicing process. The mosaicked image 987 is transformed to a set 988 of high-resolution monochromatic images, from which an image reproduction unit may derive a high-resolution polychromatic image of the image object by a superposition process depending on the selected filter colours.

Figure 3:
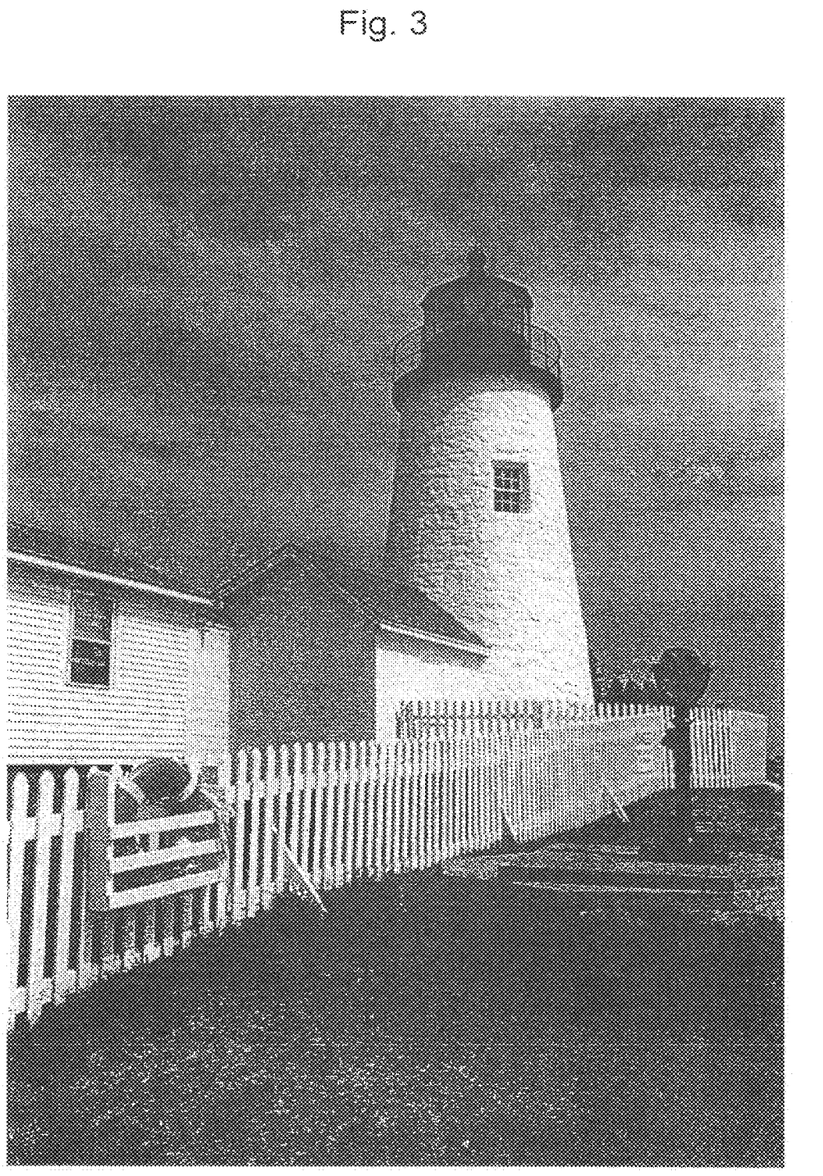
FIG. 3 shows a polychromatic high-resolution image obtained from the test scene of FIG. 1E by the process as illustrated in FIGS. 2C and D.

FIG. 3 shows the image as output by the camera system 450 of FIG. 4. The resulting image is free of colour errors and the occurrence of aliasing and zipper artefacts is reduced. Any demosaicing approach can be used to get the full up-sampled high-resolution polychromatic image, for example bilinear interpolation, median filtering or statistical modelling. Compared to a known approach for combining demosaicing with super-resolution techniques, less computational effort is required. The fabrication process for the colour filter units is significantly reduced, since all colour filter units are single-coloured, which also results in less chromatic aberrations resulting from manufacturing issues concerning mosaicked colour filter.

Elements of the above described embodiments, for example the first and second calculator units 240, 250 of the camera system 450 of FIG. 4 may be embodied in various forms, for example by hardware only, for example by integrated circuits, field programmable gate arrays (FPGAs), application specific integrated circuit (ASICs) or by software only, which may be implemented, for example in a computer program or a microcontroller memory, or by a combination of hardware and software.

Figure 5A:
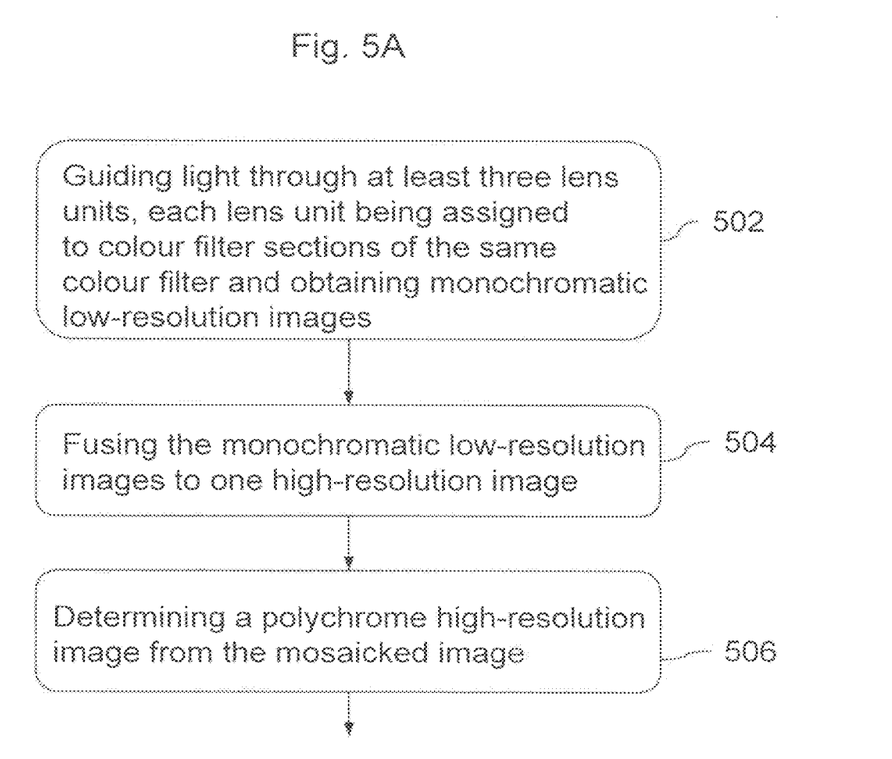
FIG. 5A is a simplified flowchart referring to a method of operating a camera system.

FIG. 5A refers to a method of operating a camera system. The method provides guiding light through at least three lens units assigned to three single-colour colour filter units of at least three different colours such that at least three monochromatic low-resolution images of different colours are obtained (502). The at least three monochromatic, low-resolution images are fused to a polychromatic high-resolution image (504).

The lens units are arranged such that the at least three monochromatic low-resolution images are shifted to each other. Combining the at least three monochromatic low-resolution images to polychromatic high-resolution image may comprise fusing the monochromatic low-resolution images to a mosaicked image by a super-resolution technique comprising shift-compensation. The method may further provide demosaicing of the mosaicked polychromatic image by interpolating, for each filter colour, virtual pixel values on the basis of pixel values of neighbouring pixel sensors.

Figure 5B:
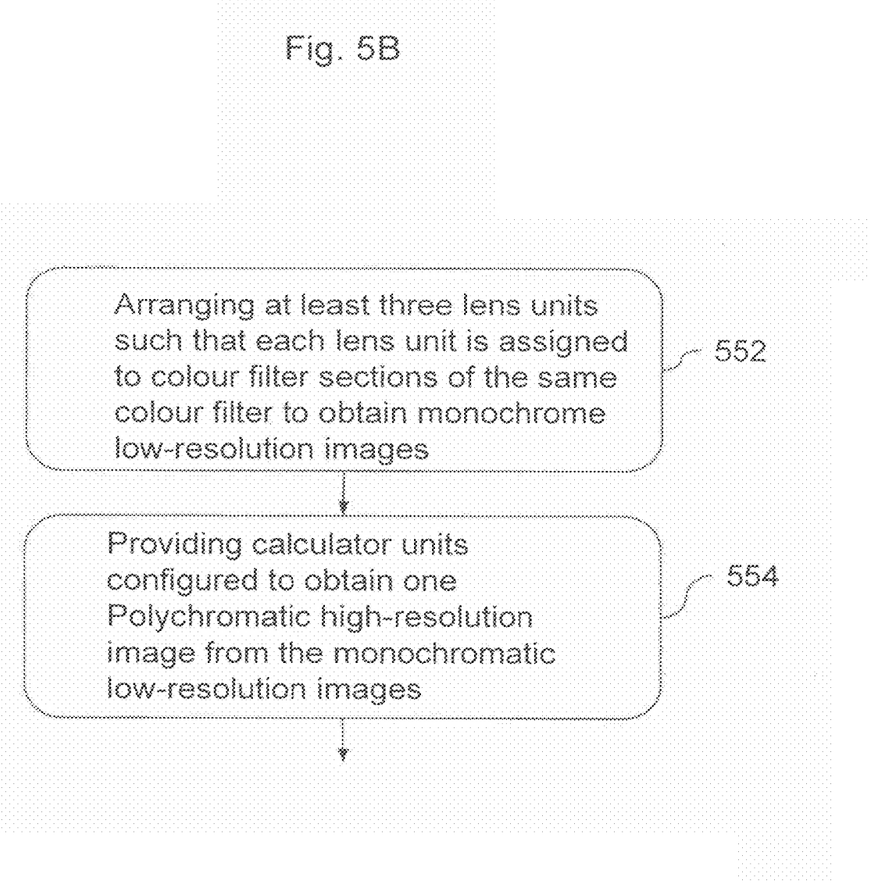
FIG. 5B is a simplified flowchart referring to a method of manufacturing a camera system in accordance with yet a further embodiment of the invention.

FIG. 5B refers to a method of manufacturing a lens and colour filter assembly. The method provides arranging at least three lens units and at least three single-colour colour filter units, wherein the plurality of colour filter units comprise colour filter sections with at least three different filter colours (552). The colour filter units are single-coloured such that each lens unit is assigned to one of at least three filter colours. Calculator units are provided for fusing the at least three monochromatic low-resolution images from the colour filter units to a polychromatic high-resolution image using shift-compensation and demosaicing (554).

The invention claimed is:

1. An imaging system comprising:
   at least three optical structures;
   at least three imaging structures that are respectively assigned to the at least three optical structures and that each capture a single-colored image of a same scene or object, at least one of the three imaging structures includes a deviated position from another one of the three imaging structures to capture a shifted version of the single-colored image that is deviated with respect to a reference point in the same scene or object imaged in both a first direction and a second direction by a deviation, and the deviation is less than a distance of one pixel; and
   image processing circuitry configured to generate a color image from at least three single-colored images captured by the three imaging structures, wherein
   a resolution of the color image is higher than a resolution of each single-colored image.

2. The imaging system of claim 1, wherein
   the at least three single-colored images each include a same resolution.

3. The imaging system of claim 1, wherein
   the resolution of the color image is four times higher than the resolution of the single-colored image.

4. The imaging system of claim 1, wherein
   a number of pixels of the color image in the first or the second direction is two times larger than a number of pixels of the single-colored image in the corresponding first or the second direction.

5. The imaging system of claim 1, wherein
   the image processing circuitry is configured to use a super-resolution technique.

6. The imaging system of claim 1, wherein
   the at least three single-colored images are respectively red, green, and blue images.

7. The imaging system of claim 1, wherein
   the imaging system includes at least four optical structures and at least four imaging structures,
   the at least four imaging structures capture at least four single-colored images that are respectively red, a first green, a second green, and blue images, and
   the image processing circuitry is configured to generate a color image from the at least four single-colored images captured by the four imaging structures.

8. The imaging system of claim 1, wherein
   the image processing circuitry is configured to perform interpolation to generate the color image.

9. The imaging system of claim 1, wherein
   the at least three optical structures include at least three lenses.

10. The imaging system of claim 9, wherein
    each lens includes a micro-lens array including a plurality of micro-lenses arranged in a matrix.

11. The imaging system of claim 9, wherein
    a number of the lenses is even.

12. The imaging system of claim 1, further comprising
    at least three color filters that are each single-colored and assigned to one of the at least three optical structures.

13. The imaging system of claim 12, wherein
    each of the at least three color filters is disposed such that light orthogonally incident on and passing through each optical structure passes through a respective color filter.

14. The imaging system of claim 1, wherein
    each of the at least three imaging structures includes a plurality of pixel sensors arranged in a matrix.

15. The imaging system of claim 14, wherein
    corresponding pixel sensors in different imaging structures are shifted with respect to each other.

16. The imaging system of claim 14, wherein
    the image processing circuitry is configured to combine single-colored images obtained from the pixel sensors to form a mosaicked image by shift-compensating pixel values output by the pixel sensors.

17. The imaging system of claim 14, further comprising
    at least three color filters that are each single-colored and assigned to one of the at least three optical structures, wherein
    each pixel sensor is assigned to one of the color filters and is arranged such that light orthogonally incident on and passing through the respective color filter is incident on the pixel sensor.

18. The imaging system of claim 17, wherein
    the image processing circuitry is configured to combine single-colored images obtained from the pixel sensors to form a mosaicked image by shift-compensating pixel values output by the pixel sensors, and
    the image processing circuitry is configured to demosaic the mosaicked image that is polychromatic by interpolating, for each filter color, virtual pixel values on the basis of pixel values of neighboring pixel sensors.

19. The imaging system of claim 1, wherein the first direction is a column direction and the second direction is a row direction.

20. A method of generating a color image, the method comprising:
    guiding light through at least three optical structures to at least three imaging structures that are respectively assigned to the at least three optical structures and that each capture a single-colored image of a same scene or object, at least one of the three imaging structures includes a deviated position from another one of the three imaging structures to capture a shifted version of the single-colored image that is deviated with respect to a reference point in the same scene or object imaged in both a first direction and a second direction by a deviation, and the deviation is less than a distance of one pixel; and
    generating, with image processing circuitry, the color image from at least three single-colored images captured by the three imaging structures, a resolution of the color image being higher than a resolution of each single-colored image.

21. Circuitry comprising:
    image processing circuitry that is configured to generate a color image from at least three images that are each a single-colored image that is captured of a same scene or object, at least one of the three single-colored images being captured at a deviated position from another one of the three single-colored images as a shifted version of the single-colored image that is deviated with respect to a reference point in the same scene or object imaged in both a first direction and a second direction by a deviation, the deviation being less than a distance of one pixel, and a resolution of the color image being higher than a resolution of each single-colored image.

* * * * *